United States Patent [19]

Arnold et al.

[11] 4,073,197

[45] Feb. 14, 1978

[54] MECHANICAL POWER AMPLIFIER, IN PARTICULAR FOR A MACHINE VISE

[76] Inventors: Franz Arnold, Spatzenweg 20, 8906 Kempten, Germany; Oscar Boehm, Basagoiti, 31, Algorta (Viscaya); Ignacio Cenaruzza, Mocherin 38, Eibar (Guipuzcua), both of Spain

[21] Appl. No.: 678,267

[22] Filed: Apr. 19, 1976

[30] Foreign Application Priority Data

Apr. 22, 1975 Germany .................. 7512789[U]

[51] Int. Cl.² ............................................. F16H 21/44
[52] U.S. Cl. ...................................................... 74/110
[58] Field of Search .................. 74/110, 516, 512, 513

[56] References Cited

U.S. PATENT DOCUMENTS

| 2,460,251 | 1/1949 | Diaz ....................................... | 74/110 |
| 2,841,032 | 7/1958 | Gimson et al. ...................... | 74/110 |
| 3,045,500 | 7/1962 | Bruun ................................... | 74/110 |

FOREIGN PATENT DOCUMENTS

| 535,723 | 2/1955 | Belgium ............................... | 74/110 |

*Primary Examiner*—Benjamin W. Wyche
*Assistant Examiner*—Wesley S. Ratliff, Jr.
*Attorney, Agent, or Firm*—Blanchard, Flynn, Thiel, Boutell & Tanis

[57] ABSTRACT

A mechanical power amplifier for a vise having housing means and a primary member and a secondary member mounted therein. At least the primary member is movable in the housing and transmits a force to force amplifying and transmitting structure also mounted in the housing to effect both an amplification of the force transmitted thereto as well as a transfer of the force from the primary member to a force transmitting member. The force amplifying and transmitting structure includes a pair of bell-crank levers arranged in a mirror-image manner relative to the center axis of the housing. Each bell-crank lever has a long lever arm with a wedge surface thereon and a short lever arm. The wedge surface engages a cam surface on the primary member and is movable laterally in response to a movement of the primary member. A pair of laterally spaced rollers are positioned on opposite sides of the center axis of the housing and engage the short lever arm and an abutment surface on the secondary member. Arcuate surfaces are provided on the side of each of the short lever arms remote from the rollers. As a result, the force transmitting member is moved relative to the housing in response to a lateral movement of the arcuate surface on the bell-crank levers caused by a movement of the primary member and the cam surface relative to the long lever arm so that each of the bell-crank levers are rocked about an axis defined by the location of engagement between the short lever arm and the roller.

14 Claims, 9 Drawing Figures

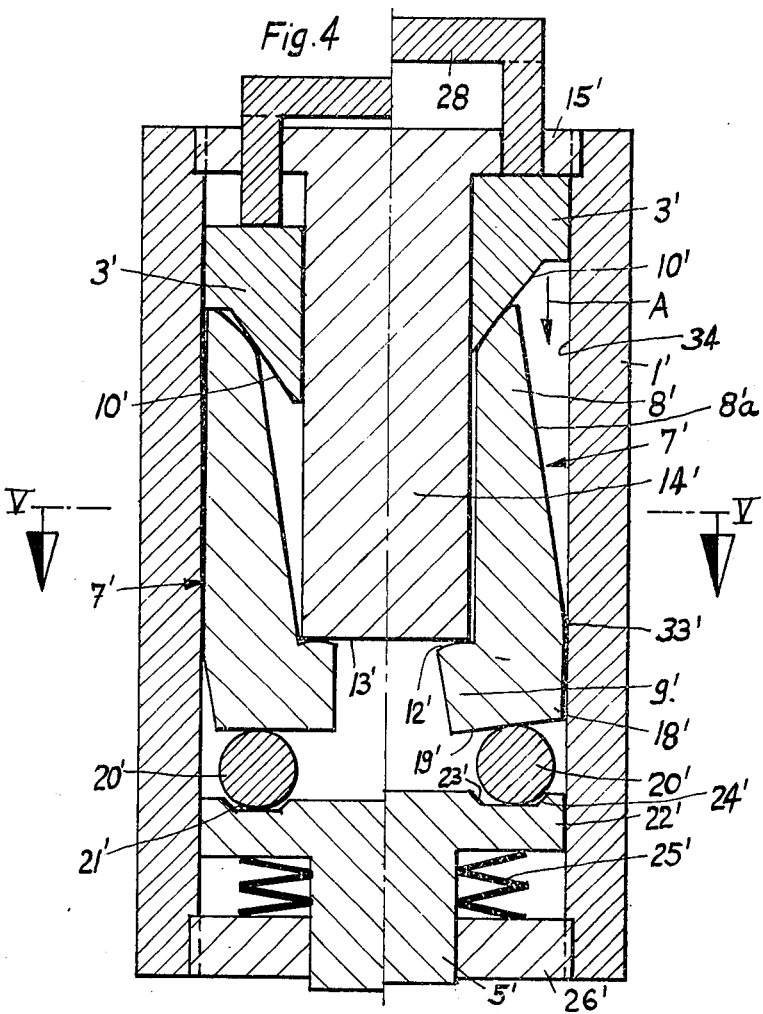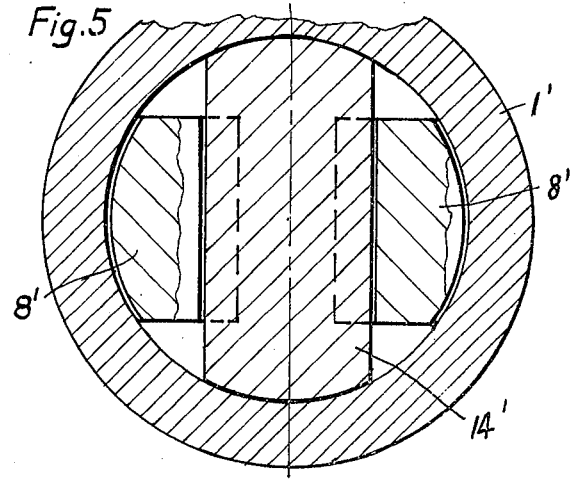

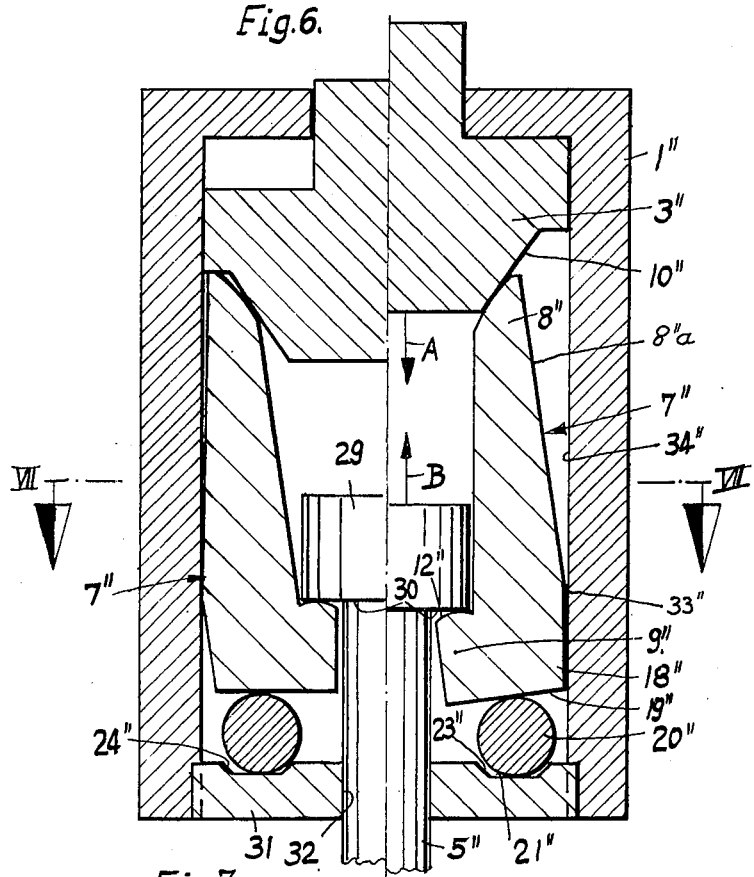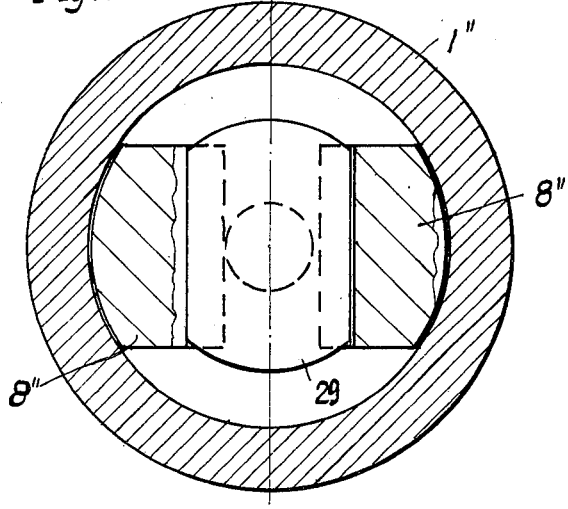

MECHANICAL POWER AMPLIFIER, IN PARTICULAR FOR A MACHINE VISE

FIELD OF THE INVENTION

The invention concerns a mechanical power amplifier, in particular for a machine vice having at least two bell-crank levers, each having a long lever arm co-operating with a wedge surface provided on a movable primary member and extending obliquely of the direction of movement of the primary member, and a short lever arm, acting on a secondary member movable in the direction of movement of the primary member — or being supported on an abutment — the bell-crank lever having on its middle part connecting together the two lever arms, a supporting surface turned away from the wedge surface, by means of which supporting surface, the bell-crank lever, with the interposition of a cylindrical roller, is supported on an abutment or on an secondary member, movable in the direction of movement of the primary member.

BACKGROUND OF THE INVENTION

In such mechanical power amplifiers, in which the power transmission ratio is produced on the one hand by the wedge surface inclined in opposition to the direction of movement of the wedge and on the other hand by the difference in length of the lever arms of the bell-crank levers, there are two types differing constructionally somewhat from one another, but which operate on the same principle and differ merely by the respective interchange of the arrangement of the abutment and secondary member. Thus, a mechanical power amplifier is known (from U.S. Pat. No. 2,335,743) in which the abutment for each bell-crank lever is a spindle mounted rigidly in the housing. A cylindrical roller is rotatably mounted on the said spindle. The short lever arm of each bell-crank lever, by means of a further spindle, engages a yoke-like secondary member common to both bell-crank levers. On displacement of a primary member provided between the long lever arms of the bell-crank levers and having two edge surfaces turned towards each other, the yoke-like secondary member is moved in opposition to the direction of movement of the primary member. Thus, in the power stroke, the secondary member is drawn into the housing in which the bell-crank levers are mounted. It is connected by a pull-rod to the movable clamping jaw of a vice with support.

In another known power amplifier (U.S. Pat. No. 2,443,775), each bell-crank lever is pivotally mounted in its middle part on a spindle rigidly mounted in the housing. The short lever arm of each bell-crank lever carries a cylindrical roller rotatable on a spindle provided on the short lever arm. The said roller acts on a secondary member which, on displacement of a primary member having two wedge surfaces, is moved in the same direction as the primary member. Each of the two secondary members acts on the movable clamping jaw of a vice.

In both known mechanical power amplifiers, therefore, two spindles are provided for each bell-crank lever, one of which spindles serves for mounting the cylindrical roller while the bell-crank lever is pivoted on the other. These spindles are subjected to considerable forces and are thus exposed to heavy wear. Since they can be loaded only to a limited extent, the known mechanical power amplifiers are either of large overall size or only relatively small clamping forces can be produced with them. In addition, owing to the said spindles, the number of necessary individual parts is increased, and therefore the production and assembly costs are also increased. Finally, however, the transmission ratio, once fixed constructionally, is either not variable at all or is variable only with very great difficulty.

The problem underlying the invention is, therefore, to provide a mechanical power amplifier, in particular for vices of the aforesaid type, which is of simpler construction, has fewer individual parts, is cheaper to make, is of small overall size, operates with little wear and in which, if necessary, the transmission ratio is easily variable.

This is achieved according to the invention in that the short lever arm on its outer side turned towards the wedge surface has a convex rolling surface with generatrices extending perpendicularly to the plane of movement of the bell-crank lever, by means of which surface the said lever arm is supported on a plane counter-surface of the secondary member or of the abutment, the said counter-surface being turned away from the wedge surface, and each bell-crank lever on its back turned away from the wedge surface has a projection approximately at the level of the rolling surface, by means of which the bell-crank lever is supported on the projection of a second bell-crank lever or on the wall of a housing.

There are no spindles in the new mechanical power amplifier. The last-mentioned is thereby simpler to produce and assemble. All the heavily loaded co-operating parts roll upon one another with line contact and free from slip, so that friction and therefore also wear are reduced to a minimum.

Thus, the rolling surfaces of the short lever arms roll on the corresponding counter-surfaces, as also the cylindrical rollers roll on the supporting surfaces of the bell-crank levers or on the oppositely situated counter-surfaces. Due to the absence of spindles, however, the overall size is substantially reduced, or in the case of equal overall size, compared with known mechanical power amplifiers of this type, a considerably greater clamping force can be produced. In addition, it is also possible in a comparatively simple manner to vary the transmission ratio of the power amplifier by shifting the cylindrical roller, with respect to the short lever arm, more or less to the outside. When it is stated here that the cylindrical roller is freely movable, this means that the cylindrical roller does not rotate on a definite fixed axis or spindle, but only on its own longitudinal axis. As the rolling movement of the cylindrical roller on the counter-surface, the said longitudinal axis is displaced.

Advantageously, the counter-surfaces should extend at right-angles to the direction of movement of the primary member, so that transmission ratios are obtained which are simple to grasp, and in addition the bell-crank levers always remain in their predetermined position.

In order that the predetermined transmission ratio of the power amplifier does not alter in the event of any unforeseen strong vibrations, which could result in shifting of the cylindrical rollers, it is expedient if the counter-surface, on which the cylindrical rollers roll, in its direction at right-angles to the direction of movement of the primary member is bounded on each side by a recess. These recesses prevent movement of the cylindrical roller beyond the recess, and by the positive abutment ensure that both rollers remain and operate at the same distance with respect to the central axis.

Another advantageous embodiment is that the supporting surface at the central part of the relaxed power amplifier is inclined with respect to the direction of movement of the primary member, and in the clamped position of the power amplifier extends approximately at right-angles to the direction of movement of the primary member. In this case, the counter-surface co-operating with the cylindrical roller should be held by spring force against the cylindrical roller and the latter against the supporting surface of the bell-crank lever for prevented unwanted movement of the cylindrical roller with respect to the surfaces co-operating with it. In addition, the spring force keeps the bell-crank levers in their correct position.

Further advantageous embodiments result from sub-claims 6 to 9.

BRIEF DESCRIPTION OF THE DRAWINGS

The invention is described in the following with reference to a number of embodiment examples represented in the drawings, in which:

FIG. 4 shows a second embodiment example in axial section;

FIG. 5 shows a cross-section on line V—V of FIG. 4;

FIG. 6 shows a third embodiment example in axial section;

FIG. 7 shows a cross-section on line VII—VII of FIG. 6;

DETAILED DESCRIPTION

Figure 1:
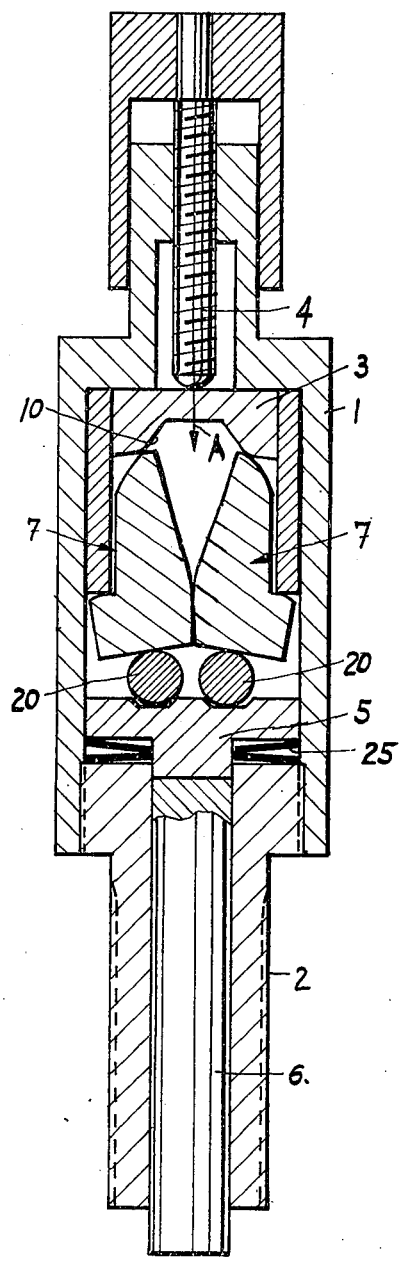
FIG. 1 shows a first embodiment example of the novel power amplifier in combination with a spindle of a machine vice.

In all the embodiment examples, the new power amplifier is situated in a cylindrical housing, since in the first place this is the simplest to make and secondly it also results in the smallest dimensions, so that the power amplifier is particularly suitable for use in machine vices. The cylindrical housing is denoted by 1 and is connected fast with the screw spindle 2 of a machine vice. For driving the primary member 3 a screw spindle 4 may be used, but any other mechanical, hydraulic or pneumatic drive device, which is suitable for exerting a force in the direction of movement A of the primary member 3, may be used. The secondary member 5 is movable in the same direction as the primary member, and the movements of primary member 3 and secondary member 5 may be in the same direction as in the embodiment examples shown in FIGS. 1 to 5, or they may be in opposite directions, as is the case in the embodiment example shown in FIGS. 6 and 7. The secondary member 5 acts on a pressure bolt 6 provided in the hollow spindle 2, which bolt in its turn may co-operate with the movable clamping jaw of a machine vice. The embodiment of the power amplifier shown on a large scale in FIG. 2 corresponds in all essential details to the embodiment shown in FIG. 1, the only difference being the closure of housing 1 by means of the two covers 15, 26.

Figure 2:
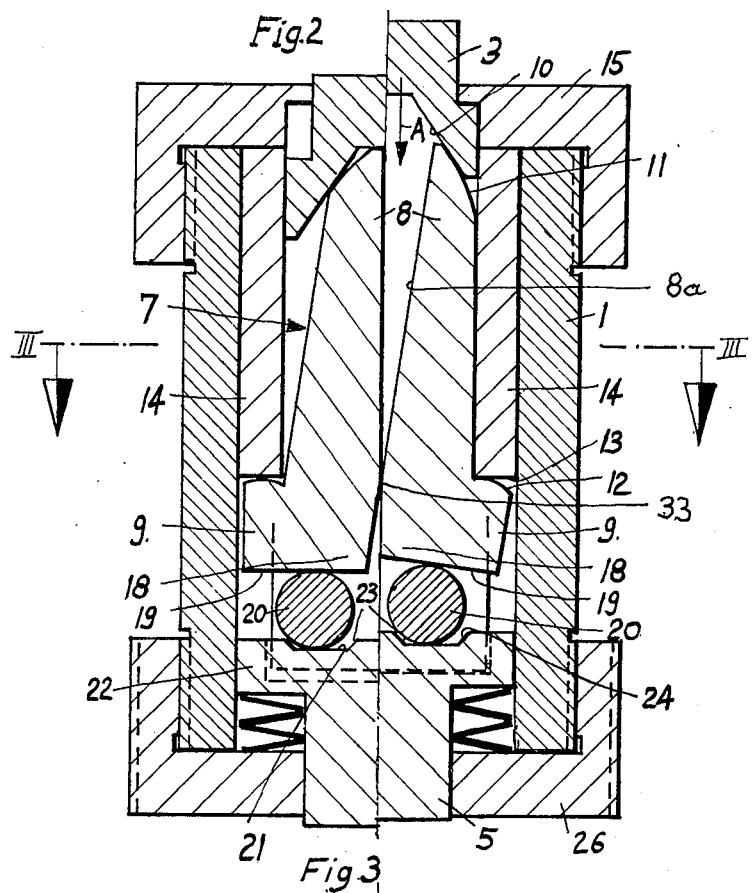
FIG. 2 shows an axial section through the first embodiment example in a somewhat modified form and on a larger scale.
Figure 3:
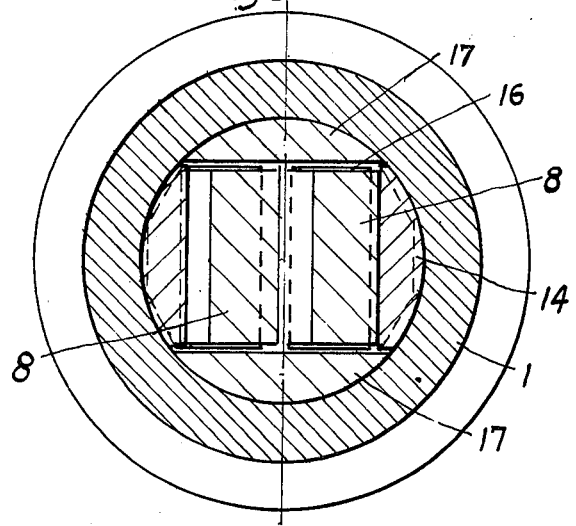
FIG. 3 shows a cross-section on line III—III of FIG. 2.

In the housing 1 two bell-crank levers 7 are arranged in mirror-image fashion with respect to its axis and have their long lever arms 8 turned towards one another. The short lever arms 9 of these bell-crank levers 7 are turned away from one another, i.e., they are directed outwardly. The primary member 3 is provided with two wedge surfaces 10 also in mirror-image fashion with respect to the axial direction, which are turned one another and co-operate with the arcuately curved surfaces 11 of the long lever arms 8. Each short lever arm 9, on its outer side turned towards the wedge surface 10, has a convexly curved rolling surface 12 with generatrices extending perpendicularly to the plane of movement of the bell-crank lever 7. In FIGS. 1 and 2, the plane of movement of the bell-crank levers 7 always coincides with the drawing surface, so that the generatrices of the convexly curved rolling surfaces 12 extend perpendicularly to the plane of the drawings. The rolling surfaces 12 co-operate with plane counter-surfaces 13 of two abutment pieces 14 inserted in the housing 1. As shown in FIG. 3, the abutment pieces 14 have a segment-shaped cross-section. They are supported by their ends turned away from the counter-surfaces 13 on a cover 15 screwed on the housing. In the housing 1, on the side surfaces 16 of the bell-crank levers 7, which surfaces extend parallel to the plane of movement, filling pieces 17 of segment shaped cross-section are provided.

Each of the two bell-crank levers, on the back of the long lever arm 8, which back is turned away from the wedge surface 10, has a projection 33 approximately on a level with the rolling surface 12. The said projection 33 is advantageously formed as a complexly curved rolling surface. The two bell-crank levers 7 are supported on each other by their projections. When the primary member 3 is operated, the bell-crank levers 7 roll on each other by their projections 33.

Each of the two bell-crank levers 7 has a middle part 18 connecting the two lever arms 8 and 9 together. On the side turned away from the wedge surface 10, the middle part 18 has a supporting surface 19 by which it is supported on a cylindrical roller 20, freely movable within certain limits. This cylindrical roller, in its turn, is supported on a plane counter-surface 21 of the secondary member 5. In the embodiment example shown, the secondary member 5 has a piston 22 carrying the two counter-surfaces 21. The counter-surfaces 21, in their direction perpendicular to the direction of movement A of the primary member are limited on both sides by a respective recess 23, 24. On the side turned away from the counter-surfaces 21, the piston 22 is supported on plate springs 25, which in their turn are supported on the screwthreaded spindle 2 and another cover 26 connected to the cylinder 1. The plate springs 25 keep the counter-surfaces 21 applied to the cylindrical rollers 20 and the latter applied to the supporting surfaces 19. By these means, the bell-crank levers 7 are also kept with their rolling surfaces applied to the abutment pieces 14.

Assemblage of the individual parts of the new power amplifier is conceivably simple. The individual parts are simply introduced one by one in the correct sequence into the cylindrical housing 1. Since in this case, there is no necessity to adhere to narrow tolerances, this can be done without difficulty in the minimum time. In the drawings, in FIGS. 2, 4 and 6, the power amplifier is shown on the right always in the relaxed state and on the left in the tensioned state. If the primary member 3 is moved in the direction A, the long lever arms 8 are swung towards each other, the short lever arms rolling with their rolling surfaces 12 on the counter-surfaces 13, without any slip taking place between the co-operating surfaces. The cylindrical rollers 20 roll on the supporting surface 19 and the counter-surface 21. Here again no slip occurs and no appreciable friction. Wear at these places is therefore practically precluded. Solely between the curved surfaces 11 of the long lever arms and the wedge surfaces 10 of the primary member 3 does a certain amount of friction occur. Since, however, the forces here are as yet relatively small, friction and hence the accompanying wear is small. If the space and power conditions permit, a roller rotatable on a spindle could also be mounted in known manner on the free ends of the long lever arms 8.

As may be gathered more particularly from FIG. 2, the supporting surface 19 on the middle part 18 of the bell-crank lever with the power amplifier relaxed, may be inclined with respect to the direction of movement A of the primary member 3. By this inclination and the force of the plate springs 25, the cylindrical roller 20 with the power amplifier relaxed may be kept applied against the recess 24 of the counter surface 21 in its correct position. On the subsequent movement of the primary member in the direction A, therefore, each of the two cylindrical rollers 20 can roll outwardly on its counter-surface 21, the predetermined transmission ratio being thereby adjusted.

Figure 8:
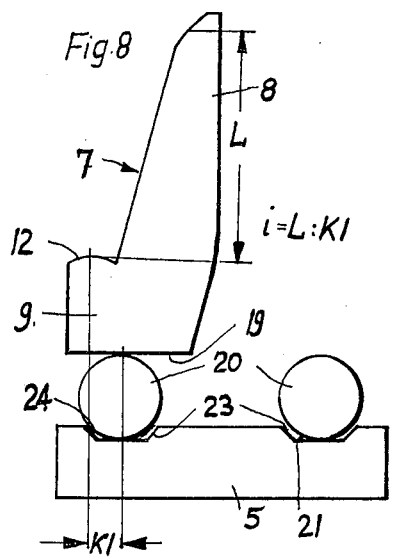
FIGS. 8 and 9 show possibilities in varying the transmission ratio.
Figure 9:
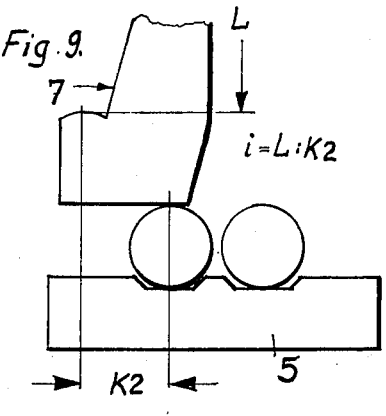

If it is desired to alter the transmission ratio, this is possible with the new power amplifier by relatively simple means. As will be gathered from FIGS. 8 and 9, the transmission ratio, attained by means of the bell-crank lever 7, is $i = L : K1$ or $i = L : K2$. Solely by displacement of the counter-surface 21 and its stop 23 and 24 on the secondary member 5 inwardly or outwardly, the transmission ratio can be varied over a large range, without variation being necessary for any other parts of the power amplifier.

The power amplifier shown in FIGS. 4 and 5 in principle functions exactly like the previously described power amplifier. Parts having the same function have therefore been given the same reference numerals with the addition of an index stroke. To avoid repetition, therefore, these parts have not been described again and the foregoing description is to be suitably applied also to the embodiment example shown in FIGS. 4 and 5. In this embodiment example, the two bell-crank levers 7' are arranged so that their long lever arms 8' are turned away from each other and their short lever arms are turned towards each other. At the center of the housing 1' an abutment piece 14' is provided in common and is connected to the housing 1' by the housing cover 15'. On both sides of the abutment piece 14' are disposed primary members 3' with wedge surfaces 10', the two primary members 3' being connected together by a yoke 28. On movement of the yoke 28 in the direction A, the long lever arms 8' of the bell-crank lever 9' force the secondary member 5' with increased force in the same direction. In this embodiment example and that shown in FIGS. 6 and 7, the bell-crank levers 7' are supported on the housing wall 34 by their projections 33'.

In the embodiment example shown in FIGS. 6 and 7, in contrast to the previously described embodiments, no reinforced thrust is produced, but a tension, i.e., the secondary member 5" moves in opposition to the primary member 3". All parts having the same function are here marked with the same reference numerals but with the addition of two index strokes. In the cylindrical housing 1", the bell-crank levers 7" are arranged so that their short lever arms 9" and turned towards one another. Between the bell-crank levers, a pull-rod with a widened head 29 is provided as secondary member 5'''. The head 29 carries counter-surfaces 30, on which the rolling surfaces 12" of the short lever arms 9" are supported. At one end of the housing 1", a housing cover 31 is provided as abutment, on which the bell-crank lever 7" is supported by its supporting surfaces 19" with the interposition of a respective cylindrical roller 20". The corresponding counter-surfaces of the abutment are shown at 21". The pull-rod 5" is passed through a bore 32 in the housing cover 31. Between the two long lever arms 8" is a common primary member 3" with outwardly turned wedge surfaces 10". On the movement of this primary part in the direction A, the long lever arms 8" of the bell-crank levers 7" are rocked outwardly and the pull-rod 5" is thus moved in the opposite direction B.

We claim:
1. A mechanical power amplifier for a vise, comprising:
   housing means;
   a primary member having cam surface means thereon and a secondary member having abutment surface means thereon, at least said primary member being mounted for movement with respect to said housing means;
   force transmitting means mounted for reciprocal movement relative to said housing means;
   force amplifying transmitting means mounted in said housing means for effecting an amplification of and a transfer of force from said primary member to said force transmitting means, said force amplifying transmitting means comprising a pair of bell-crank levers arranged in a mirror-image manner relative to the center axis of said housing means, each bell-crank lever having a long lever arm with a wedge surface thereon and a short lever arm, said wedge surface engaging said cam surface means and being movable laterally in response to a movement of said primary member, and a pair of laterally spaced roller means positioned on opposite sides of said center axis of said housing means for rollingly engaging said short lever arm and said abutment surface means and effecting a transfer of force therethrough without a relative sliding movement therebetween;
   arcuate surface means on a side of each of said short lever arms remote from said rollers, the center point for said arcuate surface means being radially spaced from the point of engagement of said short lever arm with said roller;
   whereby said force transmitting means is moved relative to said housing means in response to a lateral movement of said arcuate surface means of said bell-crank lever caused by a movement of said primary member and said cam surface relative to said long lever arm so that each of said bell-crank levers are rocked about an axis defined by the location of engagement between said short lever arm and said roller.

2. The mechanical power amplifier according to claim 1, wherein said secondary member is supported for movement relative to said housing means, said force transmitting means being engaged with said secondary member and movable in response to movement thereof.

3. The mechanical power amplifier according to claim 2, wherein said housing means includes means fixed thereto and having a pair of surfaces rollingly engaging said arcuate surface means, the lateral spacing between one of said rollers and said location of engagement between said short lever arm and said roller being laterally shifted between defined limits during said rocking of said bell-crank lever.

4. The mechanical power amplifier according to claim 3, including a pair of recesses in said secondary member; and
   wherein said defined limits are formed by the walls of said recesses in said secondary member, said abutment surface means being defined by the bottom wall of said recesses.

5. The mechanical power amplifier according to claim 4, wherein said pair of surfaces on said housing means and said bottom wall of said recesses extend perpendicular to the direction of movement (A) of said primary member.

6. The mechanical power amplifier according to claim 2, including resilient means for effecting a holding of said bell-crank levers and said rollers in engagement with each other.

7. The mechanical power amplifier according to claim 2, wherein the surface of each of said short lever arm engaging said roller is, prior to a force transmitting condition thereof, inclined to the direction of movement (A) of said primary member and, at the end of the force transmitting condition thereof, is generally perpendicular to said direction of movement.

8. The mechanical power amplifier according to claim 2, wherein each of said bell-crank levers are positioned so that said long lever arms are mutually adjacent and said wedge surfaces face away from each other and said short lever arms extend away from each other;
   wherein said housing means includes means fixed thereto and having a pair of surfaces engaging said arcuate surface means; and
   wherein said primary member has a pair of said cam surfaces facing toward each other and cooperating with said wedge surfaces to effect said rocking of said bell-crank in response to said movement of said primary member.

9. The mechanical power amplifier according to claim 2, wherein said housing means is a hollow cylinder;
   wherein said housing means includes means fixed thereto and having a pair of surfaces engaging said arcuate surface means;
   wherein said bell-crank levers each have flat lateral surfaces; and
   including filler pieces for filling the space between said flat lateral surface on said bell-crank levers and the internal arcuate surface of said housing means.

10. The mechanical power amplifier according to claim 2, wherein each of said bell-crank levers has a projection thereon on the side thereof remote from said short lever arm; and
    wherein said projections form a rolling surface and rollingly engage each other along said projections.

11. The mechanical power amplifier according to claim 2, wherein each of said bell-crank levers are positioned so that said short lever arms are mutually adjacent and said wedge surfaces face toward each other;
    wherein said housing means includes means fixed thereto and supported between said bell-crank levers and having a common surface engaging said arcuate surface members on each of said bell-crank levers; and
    wherein said primary member has a pair of said cam surfaces facing away from each other and cooperating with said wedge surfaces to effect said rocking of said bell-cranks in response to said movement of said primary member.

12. The mechanical power amplifier according to claim 11, wherein said housing means includes a housing cover through which said secondary member and said force transmitting means are connected; and
    including resilient means between said housing cover and said secondary member for effecting a holding of said bell-crank levers and said rollers in engagement with each other.

13. The mechanical power amplifier according to claim 1, wherein said secondary member is fixed to said housing means.

14. The mechanical power amplifier according to claim 13, wherein each of said bell-crank levers are positioned so that said short lever arms are mutually adjacent and said cam surfaces face toward each other;
    wherein said primary member has a pair of said cam surfaces facing away from each other and cooperating with said wedge surfaces to effect said rocking of said bell-cranks in response to said movement of said primary member;
    wherein each of said bell-crank levers has a projection thereon on the side thereof remote from said short lever arm;
    wherein said projections form a rolling surface and engage the internal wall of said housing means; and
    wherein said force transmitting means includes a common surface thereon engaging both of said arcuate surface means on said bell-crank levers.

* * * * *